US012606072B2

(12) United States Patent (10) Patent No.: US 12,606,072 B2
Ko et al. (45) Date of Patent: Apr. 21, 2026

(54) CUP HOLDER FOR ARMREST OF VEHICLE

(71) Applicant: HYUNDAI TRANSYS INC., Seosan-si (KR)

(72) Inventors: Hyun Tak Ko, Hwaseong-si (KR); Jae Young Lim, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 148 days.

(21) Appl. No.: 18/597,213

(22) Filed: Mar. 6, 2024

(65) Prior Publication Data

US 2024/0308407 A1 Sep. 19, 2024

(30) Foreign Application Priority Data

Mar. 16, 2023 (KR) ........................ 10-2023-0034561

(51) Int. Cl.
*B60N 3/10* (2006.01)
*B60N 2/75* (2018.01)
(52) U.S. Cl.
CPC ............. *B60N 3/102* (2013.01); *B60N 2/793* (2018.02)
(58) Field of Classification Search
CPC .......... B60N 2/793; B60N 3/102; A47C 7/624
See application file for complete search history.

(56) References Cited

U.S. PATENT DOCUMENTS 4,530,480 A * 7/1985 Pratt ...................... B60N 3/102
248/311.2
2006/0038101 A1* 2/2006 Oana ...................... B60N 3/102
248/311.2

FOREIGN PATENT DOCUMENTS

JP 05012267 U 2/1993
JP 07-291012 A 11/1995
JP 2013-535375 A 2/2012
KR 10-2009-0097776 A 9/2009
KR 10-2016-0025463 A 3/2016

OTHER PUBLICATIONS

Request for the Submission of an Opinion in Korean Patent Application No. 10-2023-0034561 dated Feb. 17, 2025.
Written Decision on Registration dated Sep. 29, 2025 from Korea Application No. 10-2023-0034561.

* cited by examiner

*Primary Examiner* — Ashesh Dangol
(74) *Attorney, Agent, or Firm* — Quantum Patent Law Firm; Seongyoune Kang

(57) ABSTRACT

A cup holder for an armrest of a vehicle is mounted in an armrest of an independent seat so as to be deployed therefrom and stored therein. The cup holder includes an armrest including an open storage space defined in one side portion thereof, a support plate mounted on the bottom of the storage space, a cup holding unit mounted in the storage space and on the support plate so as to be deployed and stored and including a plurality of holding links foldably and unfoldably connected to each other so as to support a peripheral portion of a cup, and a cup support unit mounted in the storage space and on the support plate so as to be deployed and stored and including a plurality of support links foldably and unfoldably connected to each other so as to support a lower surface of the cup.

14 Claims, 9 Drawing Sheets

BACKGROUND ART

BACKGROUND ART

BACKGROUND ART

CUP HOLDER FOR ARMREST OF VEHICLE

CROSS-REFERENCE TO RELATED APPLICATION

This application claims under 35 U.S.C. § 119(a) the benefit of priority to Korean Patent Application No. 10-2023-0034561 filed on Mar. 16, 2023, the entire contents of which are incorporated herein by reference.

BACKGROUND

(a) Technical Field

The present disclosure relates to a cup holder for an armrest of a vehicle. More particularly, it relates to a cup holder for an armrest of a vehicle that has a novel structure for being mounted in an armrest of an independent seat so as to be deployed therefrom and stored therein.

(b) Background Art

Generally, an armrest for vehicles is classified into a console armrest disposed between a driver seat and a front passenger seat, a rear armrest foldably mounted between left and right rear seatbacks, and a manual armrest pivotably mounted to a seatback of an independent seat.

Since a console or rear armrest has a volume and an area large enough to allow a cup holder to be mounted thereon, a cup holder is mounted on a console or rear armrest in most vehicles.

However, since an armrest mounted to an independent seat is manufactured in a slim structure, it is not possible to mount a cup holder in the armrest or on the upper surface of the armrest.

Therefore, as shown in FIG. 1, a cup holder 20 may be mounted to a distal end of an armrest 10 of an independent seat so as to protrude therefrom. Alternatively, as shown in FIG. 3, a user may purchase a separate cup holder 22 and may hang the same on the armrest 10 of the independent seat.

However, in the case in which the cup holder 20 is mounted to the distal end of the armrest 10, when the armrest 10 is rotated to be located at a non-use position, as shown in FIG. 2, the cup holder 20 is located at a higher position than the top of the seatback, thus obstructing not only the rear view of a driver but also the front view of a passenger in a rear seat (e.g., third-row seat).

In addition, in the event of sudden stop or collision of the vehicle, a passenger may be injured by contact with the cup holder 20 located at a higher position than the top of the seatback.

Further, in the case in which the cup holder 22 is used in a state of being hung on the armrest 10, as shown in FIG. 4, the cup holder 22 protrudes from the armrest 10 and is located in a space between a left independent seat and a right independent seat. Therefore, the cup holder 22 acts as a barrier to a passage for a passenger of a rear seat (e.g., third-row seat), thus causing inconvenience to the passenger of the rear seat when the passenger gets in or out of the vehicle.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide a cup holder for an armrest of a vehicle that has a novel structure for being mounted in an armrest of an independent seat so as to be deployed to a position beside the armrest when used and to be stored in the armrest when not in use.

In one aspect, the present disclosure provides a cup holder for an armrest of a vehicle, which includes an armrest including an open storage space defined in one side portion thereof, a support plate mounted on the bottom of the storage space, a cup holding unit mounted in the storage space and on the support plate so as to be deployed and stored and including a plurality of holding links foldably and unfoldably connected to each other so as to support a peripheral portion of a cup, and a cup support unit mounted in the storage space and on the support plate so as to be deployed and stored and including a plurality of support links foldably and unfoldably connected to each other so as to support a lower surface of the cup.

In a preferred embodiment, an inner portion of an upper surface of the support plate may be formed as a first storage surface on which the cup holding unit is stored, and an outer portion of the upper surface of the support plate may be formed as a second storage surface on which the cup support unit is stored. The second storage surface may be formed to have a lower height than the first storage surface.

In another preferred embodiment, the cup holding unit may include a first holding link hinged at one end portion thereof to a rear end portion of the support plate and connected to a first support link of the cup support unit so as to rotate in engagement therewith, a second holding link hinged at one end portion thereof to the other end portion of the first holding link, and a third holding link hinged at one end portion thereof to a middle portion of the support plate and hinged at the other end portion thereof to the other end portion of the second holding link.

In still another preferred embodiment, the cup holder may include a first spring connected between one end portion of the first holding link and the support plate in order to provide elastic restoring force to the first holding link in an unfolding direction.

In yet another preferred embodiment, the cup support unit may include a first support link hinged at one end portion thereof to a rear end portion of the support plate, including a first hinge hole formed through both side surfaces of the other end portion thereof and a first hinge groove formed therein at a position behind the first hinge hole, and connected to the first holding link of the cup holding unit so as to rotate in engagement therewith, a second support link hinged at one end portion thereof to the first hinge groove in the first support link, a third support link hinged at one end portion thereof to the first hinge hole in the first support link, and a fourth support link configured to support the lower surface of the cup and including a second hinge groove formed in the end of one end portion thereof so as to allow the other end portion of the second support link to be hinged thereto and a second hinge hole formed through both side surfaces thereof at a position in front of the second hinge groove so as to allow the other end portion of the third support link to be hinged thereto.

In still yet another preferred embodiment, the first hinge hole, the first hinge groove, the second hinge groove, and the second hinge hole may be arranged in a parallelogram trajectory in order to ensure that, when the second support link and the third support link are unfolded so as to extend vertically, the fourth support link is in a state of extending horizontally so as to support the lower surface of the cup.

In a further preferred embodiment, the first support link may include a guide pin formed on an upper surface thereof, and the first holding link may include a straight guide groove formed therein so as to allow the guide pin to be slidably inserted thereinto.

In another further preferred embodiment, the cup holder may include a locking block having a locking pin and mounted on a front end portion of the support plate in order to lock or unlock the third holding link.

In still another further preferred embodiment, the cup holder may include a rotary plate integrally formed on an outer side surface of the third holding link, and the rotary plate may include a cam path formed in a lower surface thereof so as to allow the locking pin to be inserted thereinto so as to be locked or unlocked.

In yet another further preferred embodiment, the cam path may include an introduction path into which the locking pin is introduced, a discharge path from which the locking pin is discharged, a locking recess formed in a boundary portion between the introduction path and the discharge path so as to allow the locking pin to be inserted thereinto so as to be locked, and a guide path inclined to guide the locking pin inserted into the locking recess to the discharge path.

In still yet another further preferred embodiment, the cup holder may include a second spring attached to the support plate in order to elastically support the rotary plate.

In a still further preferred embodiment, the cup holder may include a speed control damper having a damper gear and mounted on the support plate and a sector gear formed on an outer diameter surface of one end portion of the first holding link so as to mesh with the damper gear.

Other aspects and preferred embodiments of the disclosure are discussed infra.

It is understood that the term "vehicle" or "vehicular" or other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
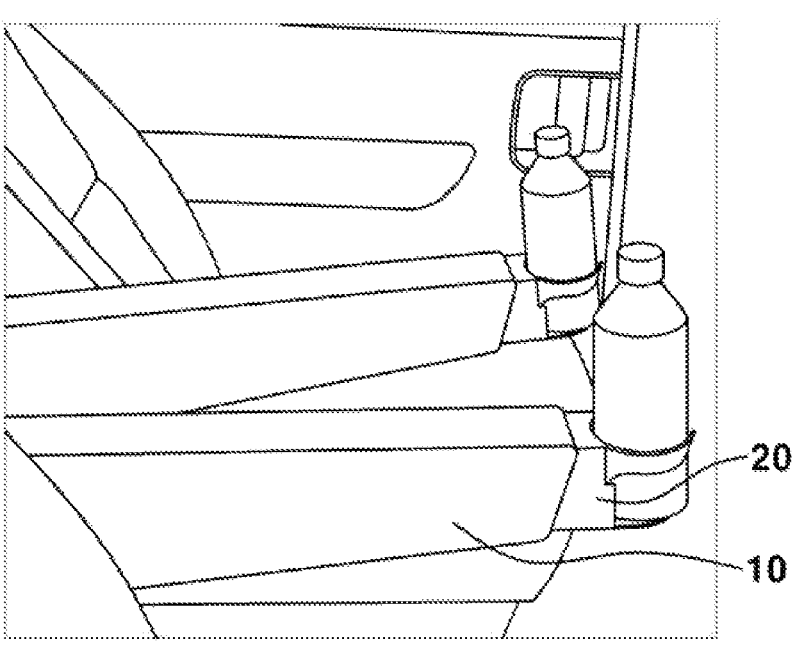
FIG. 1 is an image view of the related art in which a cup holder is mounted to a distal end of an armrest of an independent seat.
Figure 2:
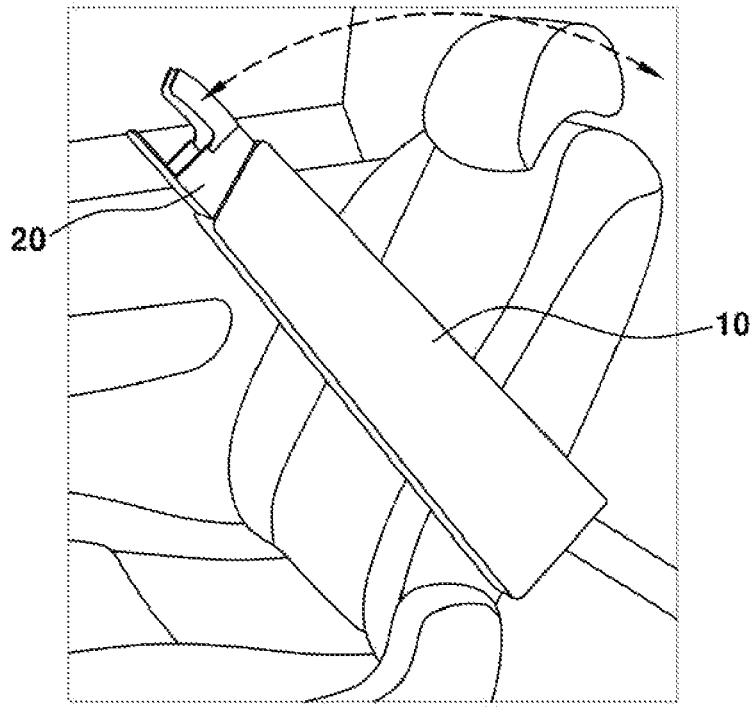
FIG. 2 is an image view for explaining the problem with the related art shown in FIG. 1.
Figure 3:
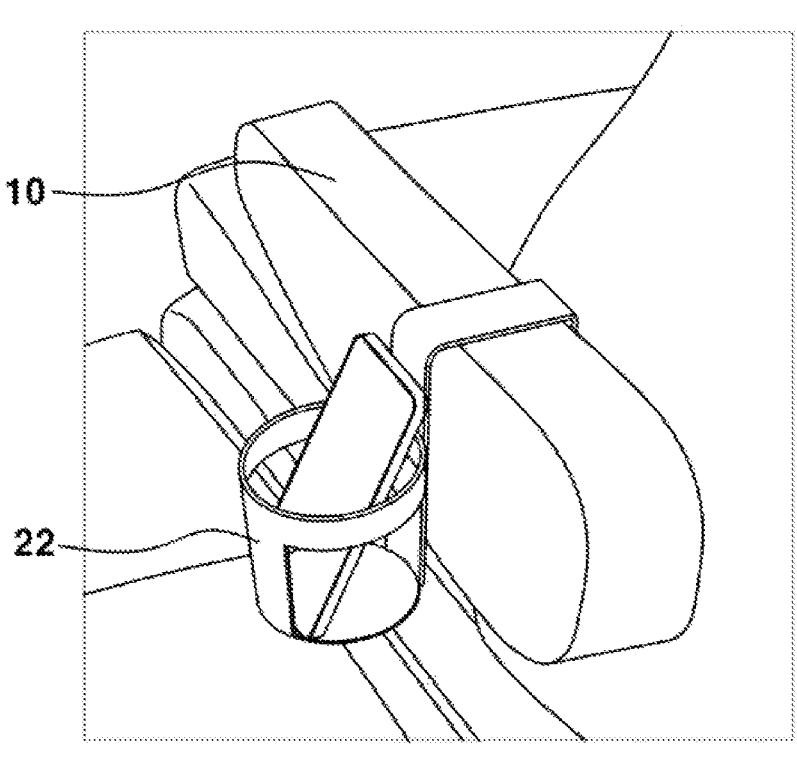
FIG. 3 is an image view of the related art in which a separate cup holder is hung on an armrest of an independent seat.
Figure 4:
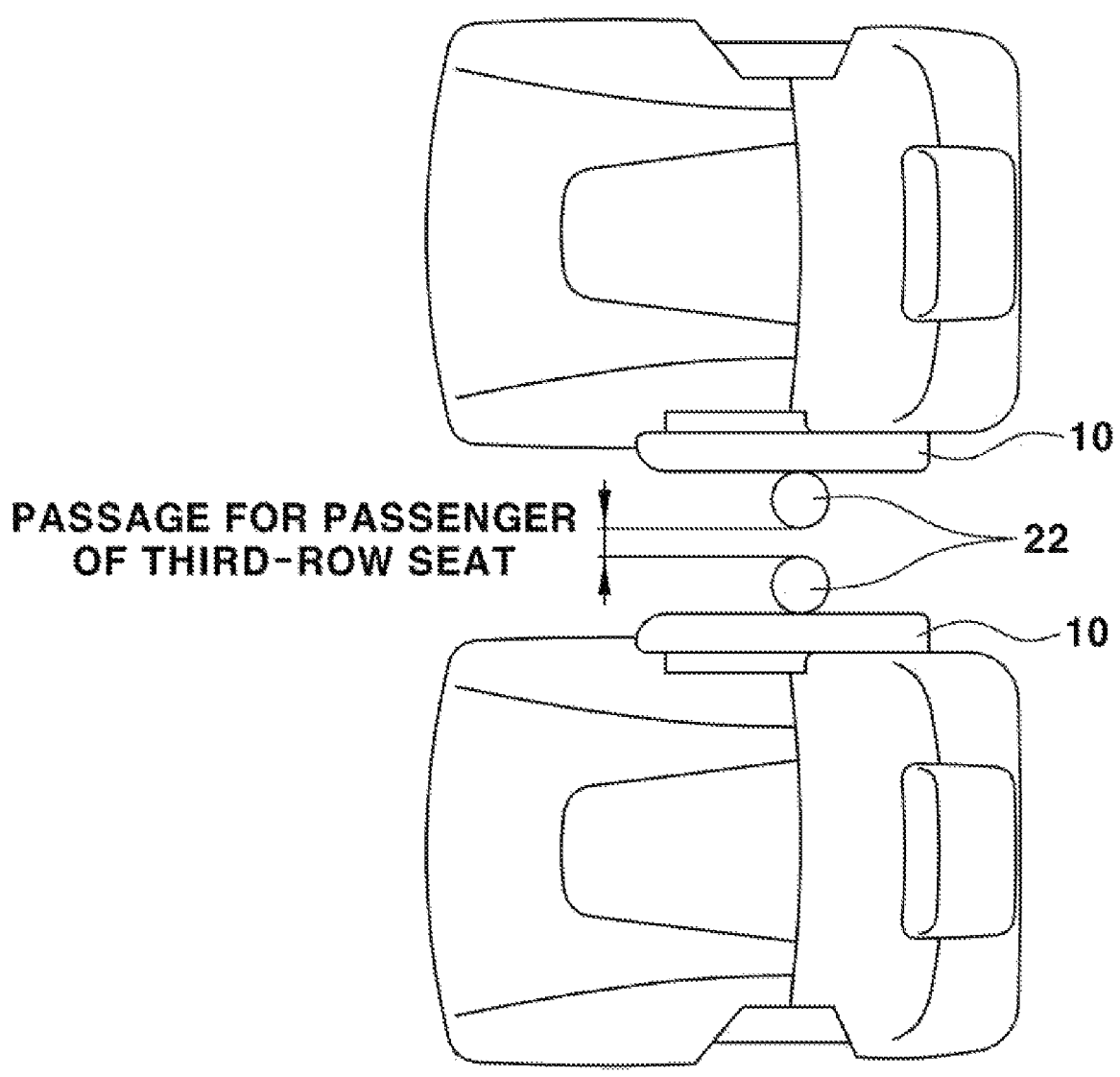
FIG. 4 is an image view for explaining the problem with the related art shown in FIG. 3.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings.

Figure 5:
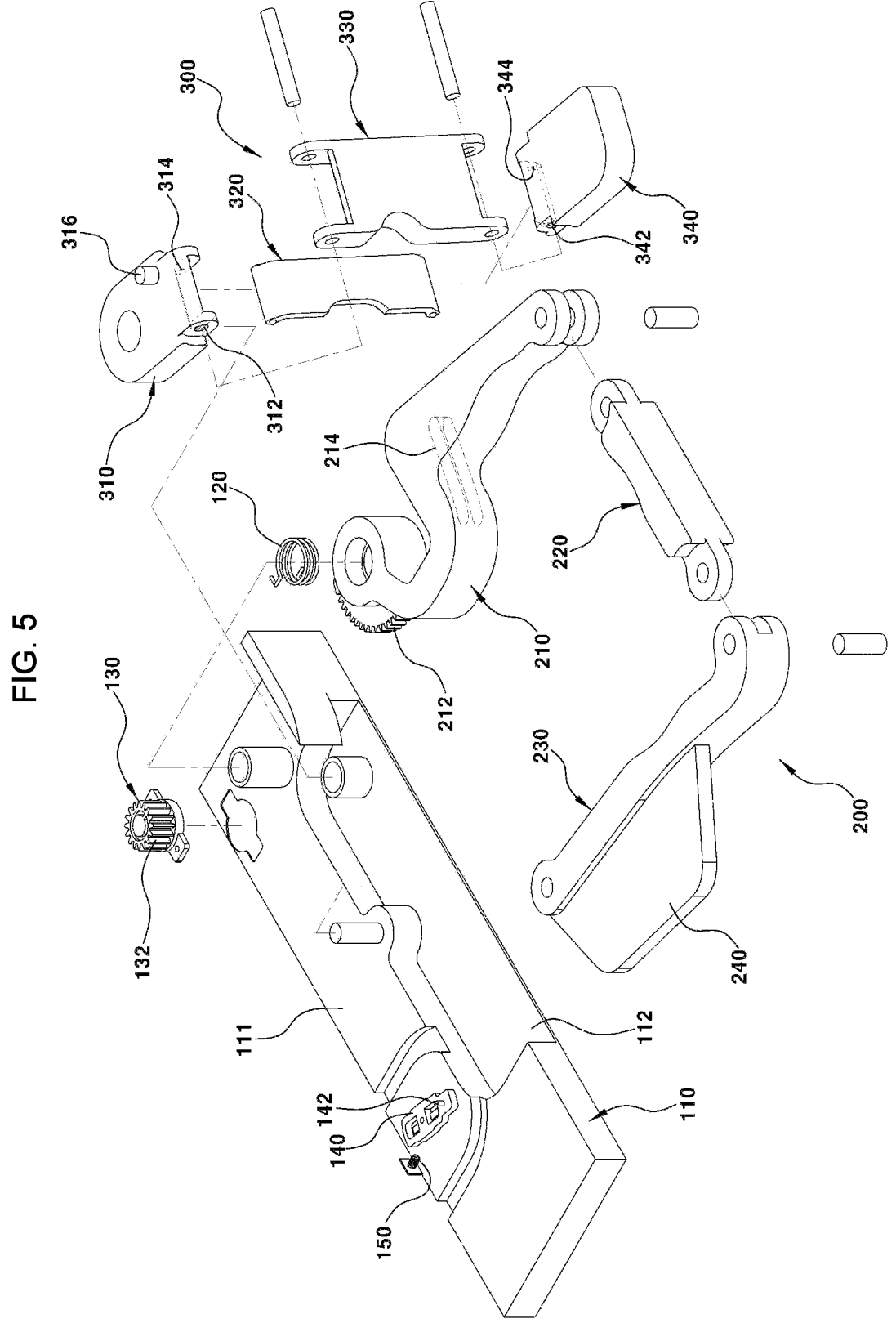
FIG. 5 is an exploded perspective view of a cup holder for an armrest of a vehicle according to the present disclosure.
Figure 6:
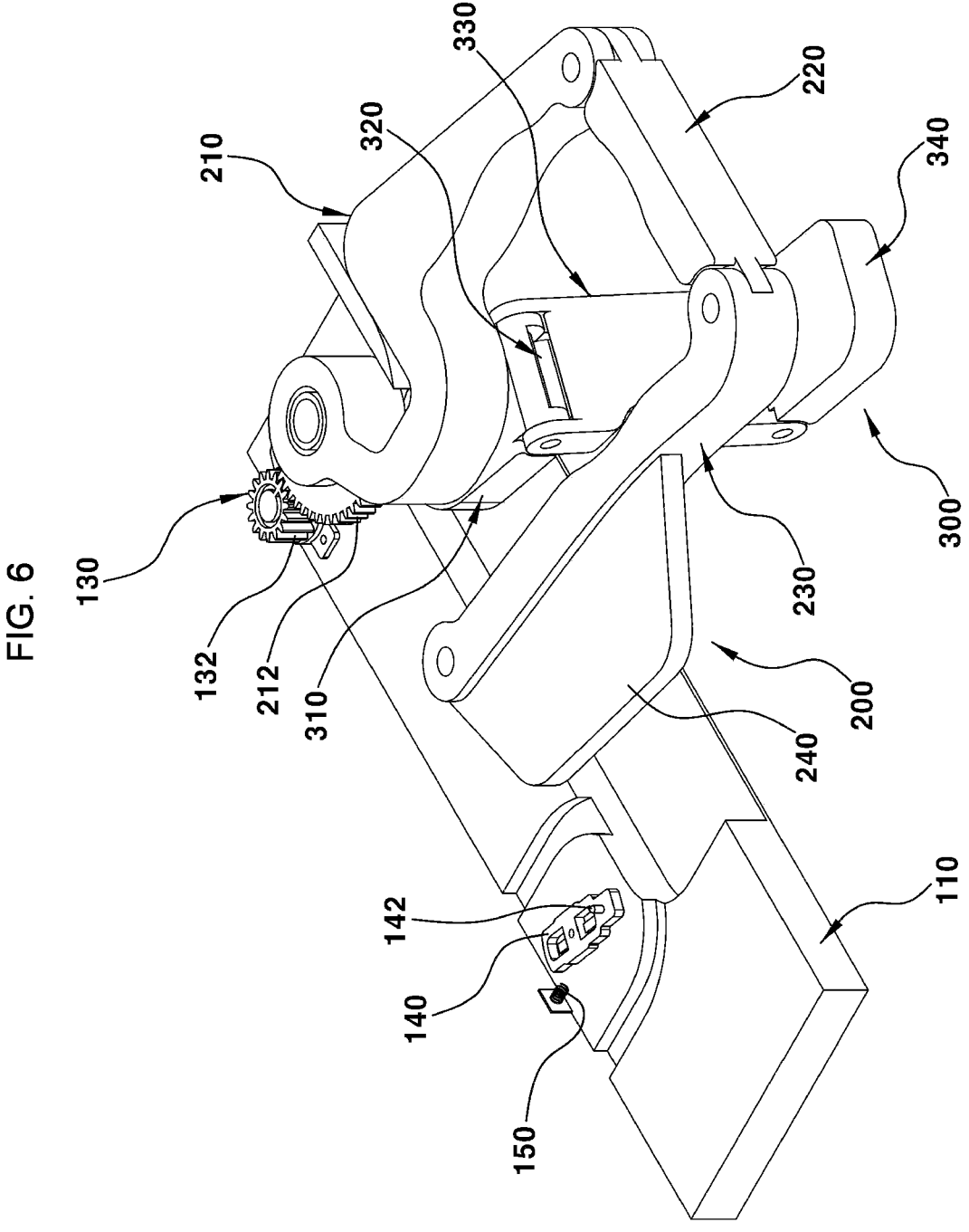
FIG. 6 is an assembled perspective view of the cup holder for an armrest of a vehicle according to the present disclosure.

FIG. 5 is an exploded perspective view of a cup holder for an armrest of a vehicle according to the present disclosure, and FIG. 6 is an assembled perspective view of the cup holder for an armrest of a vehicle according to the present disclosure. Reference numeral 100 indicates an armrest rotatably mounted to an independent seat.

The armrest 100 is formed such that an open storage space 102 is defined in one side portion thereof in order to store a cup holder. A support plate 110 is attached to the bottom of the storage space 102 in the armrest 100. The cup holder is mounted on the support plate 110 so as to be able to be deployed.

A cup holding unit 200 configured to support the peripheral portion of a cup and a cup support unit 300 configured to support the lower surface of the cup are rotatably mounted on the support plate 110 so as to be able to be deployed and stored.

Preferably, an inner portion of the upper surface of the support plate 110 is formed as a first storage surface 111 on which the cup holding unit 200 is stored, and an outer portion of the upper surface of the support plate 110 is formed as a second storage surface 112 on which the cup support unit 300 is stored. The second storage surface 112 is formed to have a lower height than the first storage surface 111.

Accordingly, when the cup holding unit 200 and the cup support unit 300 are stored in the storage space 102 in the armrest 100, the cup holding unit 200 is placed on the first storage surface 111, and the cup support unit 300 is placed on the second storage surface 112, whereby the cup holding unit 200 and the cup support unit 300 may be easily stored in the storage space 102 in a manner of being stacked vertically.

The cup holding unit 200 is configured such that a plurality of holding links is foldably and unfoldably connected to each other so as to support the peripheral portion of a cup.

In detail, the cup holding unit 200 is configured such that a first holding link 210, a second holding link 220, and a third holding link 230 are foldably and unfoldably connected to each other. When the first holding link 210, the second holding link 220, and the third holding link 230 are unfolded, the first to third holding links 210, 220, and 230 are arranged in a U-shape to support the peripheral portion of the cup.

To this end, the first holding link 210 is hinged at one end portion thereof to a rear end portion of the support plate 110 and is hinged at the other end portion thereof to one end portion of the second holding link 220. In addition, the first holding link 210 is connected to a first support link 310 of the cup support unit 300 so as to rotate in engagement therewith.

In addition, the second holding link 220 is formed in a bar shape, one end portion of which is hinged to the other end portion of the first holding link 210 and the other end portion of which is hinged to the other end portion of the third holding link 230.

In addition, the third holding link 230 is hinged at one end portion thereof to a middle portion of the support plate 110 and is hinged at the other end portion thereof to the other end portion of the second holding link 220.

Figure 7A:
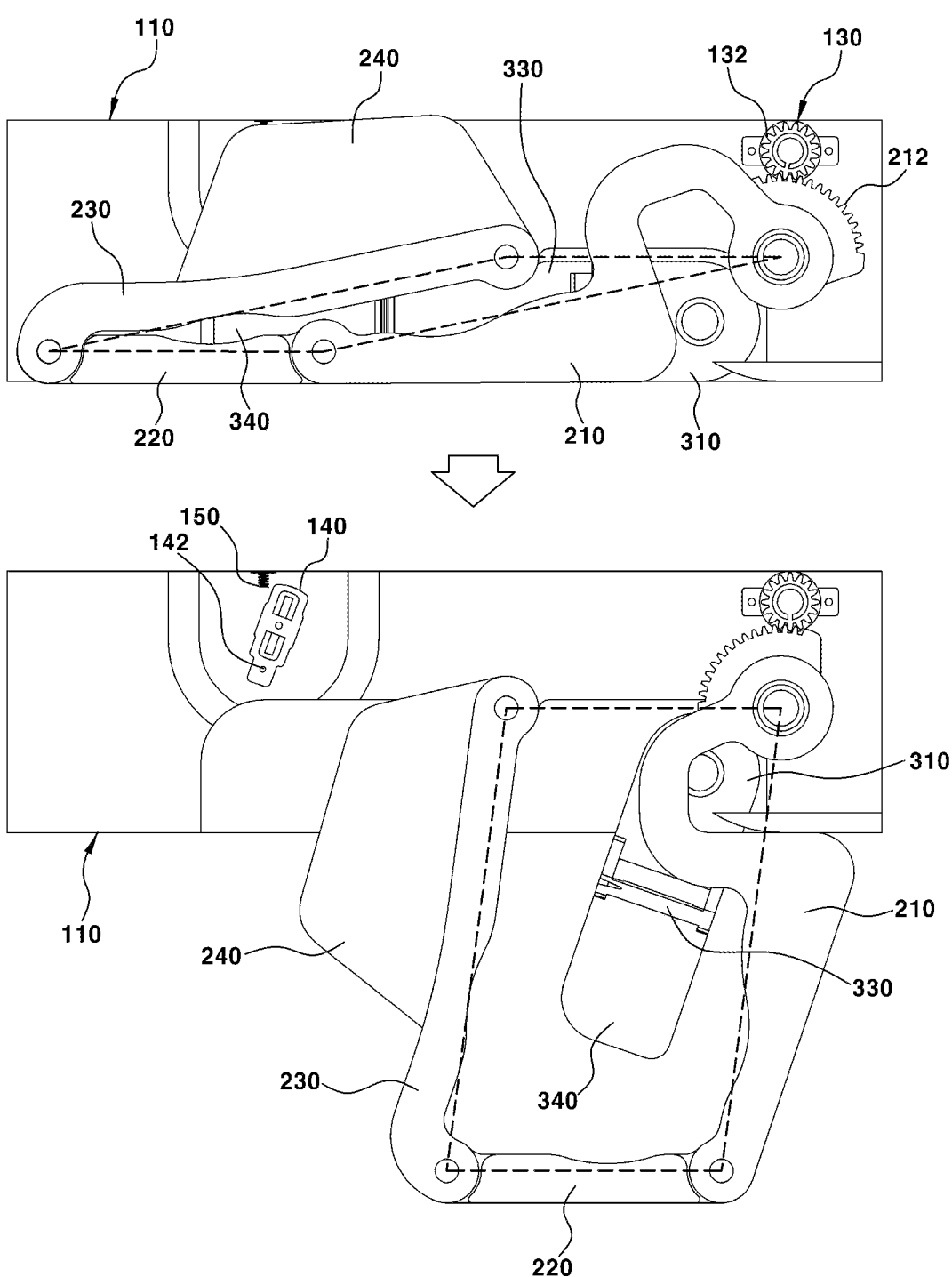
FIG. 7A is a plan view showing states before and after deployment of a cup holding unit of the cup holder for an armrest of a vehicle according to the present disclosure.

Therefore, when the first holding link 210, the second holding link 220, and the third holding link 230 are stored in the storage space 102 in the armrest 100, as shown in FIG. 7A, the first holding link 210 and the second holding link 220 may be arranged in a straight line in a forward-backward direction, and the third holding link 230 may be folded while forming as small an angle as possible with the second holding link 220.

On the other hand, when the first holding link 210 is rotated outward about the hinge point at one end portion thereof and the third holding link 230 is rotated outward about the hinge point at one end portion thereof, as shown in FIG. 7A, the first holding link 210, the second holding link 220, and the third holding link 230 may be unfolded in a U-shape so as to support the peripheral portion of the cup.

In this case, a first spring 120, which is of a coil type, is connected between one end portion of the first holding link 210 and a predetermined portion of the support plate 110 in order to provide elastic restoring force to the first holding link 210 in an outward direction in which the first holding link 210 is unfolded.

Preferably, a speed control damper 130 having a damper gear 132 is mounted on the support plate 110, and a sector gear 212 is formed on the outer diameter surface of one end portion of the first holding link 210 so as to mesh with the damper gear 132. Therefore, the unfolding speed of the first holding link 210, the second holding link 220, and the third holding link 230 may be controlled to be constant by the speed control damper 130.

The cup support unit 300 is configured such that a plurality of support links is foldably and unfoldably connected to each other so as to support the lower surface of the cup.

In detail, the cup support unit 300 is configured such that a first support link 310, a second support link 320, a third support link 330, and a fourth support link 340 are foldably and unfoldably connected to each other. When the first support link 310, the second support link 320, the third support link 330, and the fourth support link 340 are unfolded, the second support link 320 and the third support link 330 are rotated downward with respect to the first support link 310 so as to extend vertically, and the fourth support link 340 is maintained in a state of extending horizontally so as to support the lower surface of the cup.

To this end, the first support link 310 is hinged at one end portion thereof to the rear end portion of the support plate 110, and includes a first hinge hole 312 formed through both side surfaces of the other end portion thereof and a first hinge groove 314 formed therein at a position behind the first hinge hole 312. The first support link 310 is connected to the first holding link 210 of the cup holding unit 200 so as to rotate in engagement therewith.

In addition, the fourth support link 340 includes a second hinge groove 344 formed in the end of one end portion thereof and a second hinge hole 342 formed through both side surfaces thereof at a position in front of the second hinge groove 344.

In addition, the second support link 320 is formed in a plate shape, one end portion of which is hinged to the first hinge groove 314 in the first support link 310 and the other end portion of which is hinged to the second hinge groove 344 in the fourth support link 340.

In addition, the third support link 330 is formed to have a larger width than the second support ink 320. The third support link 330 is formed in a plate shape, one end portion of which is hinged to the first hinge hole 312 in the first support link 310 and the other end portion of which is hinged to the second hinge hole 342 in the fourth support link 340.

Figure 7B:
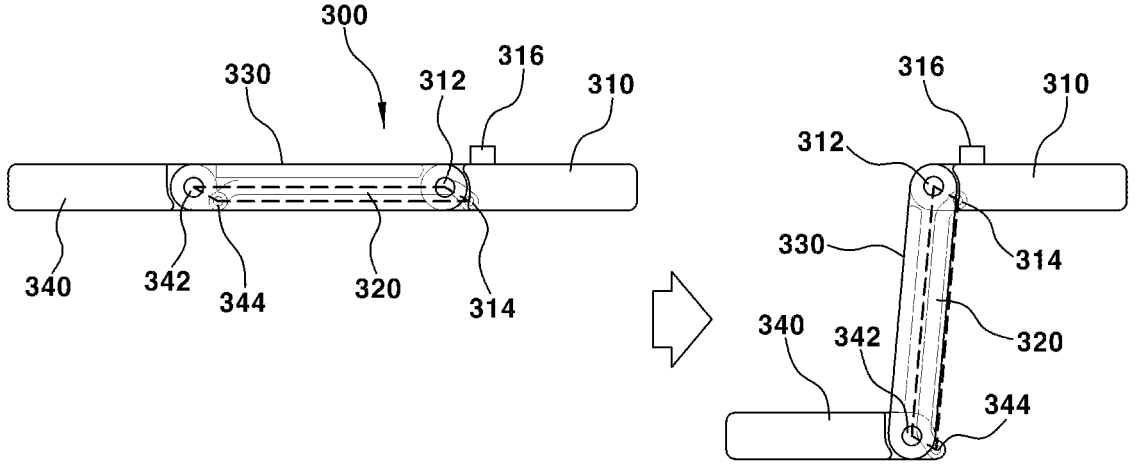
FIG. 7B is a side-sectional view showing states before and after deployment of a cup support unit of the cup holder for an armrest of a vehicle according to the present disclosure.

In particular, the first hinge hole 312 and the first hinge groove 314 in the first support link 310 and the second hinge groove 344 and the second hinge hole 342 in the fourth support link 340 are arranged in a parallelogram trajectory, as shown in FIG. 7B. The reason for this is to ensure that, when the second support link 320 and the third support link 330 are unfolded so as to extend vertically, the fourth support link 340 is in a state of extending horizontally so as to support the lower surface of the cup.

In more detail, when the center point of the first hinge hole 312, the center point of the first hinge groove 314, the center point of the second hinge groove 344, and the center point of the second hinge hole 342 are connected using virtual straight lines, as shown in FIG. 7B, a parallelogram trajectory is formed. The reason for this is to ensure that, when the second support link 320 and the third support link 330 are unfolded so as to extend vertically, the fourth support link 340 is in a state of extending horizontally so as to support the lower surface of the cup.

In this case, the first holding link 210 of the cup holding unit 200 is connected to the first support link 310 of the cup support unit 300 so as to rotate in engagement therewith.

In other words, the first support link 310 of the cup support unit 300 is connected to the first holding link 210 of the cup holding unit 200 so as to rotate in engagement therewith.

Figure 8:
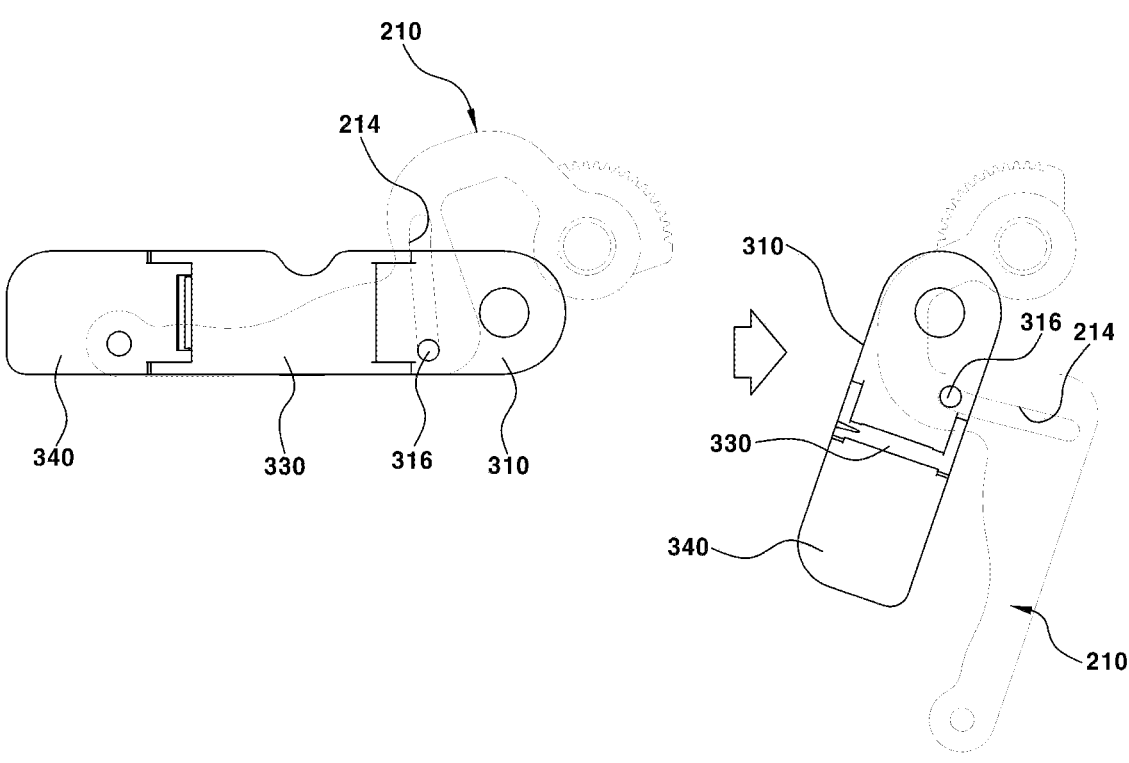
FIG. 8 is a plan view showing an operational state in which a first holding link of the cup holding unit and a first support link of the cup support unit are rotated together in the cup holder for an armrest of a vehicle according to the present disclosure.

To this end, as shown in FIG. 8, a guide pin 316 is formed on the upper surface of the first support link 310, and a straight guide groove 214, into which the guide pin 316 is slidably inserted, is formed in the lower surface of the first holding link 210.

As such, since the guide groove 214 forms a straight path, when the first holding link 210 is rotated to be unfolded to the outside of the storage space 102, as shown in FIG. 8, the guide pin 316 inserted into the guide groove 214 is pushed in the direction in which the first holding link 210 is rotated to be unfolded, whereby the first support link 310 on which the guide pin 316 is formed may be easily rotated together with the first holding link 210 in the unfolding direction in the same rotation trajectory as the first holding link 210.

Further, since the guide groove 214 forms a straight path, when the first holding link 210 is rotated to be stored in the storage space 102, as shown in FIG. 8, the guide pin 316 inserted into the guide groove 214 is pushed in the direction in which the first holding link 210 is rotated to be stored, whereby the first support link 310 on which the guide pin 316 is formed may be easily rotated into the storage space 102 together with the first holding link 210 in the same rotation trajectory as the first holding link 210.

In addition, a locking block 140 having a locking pin 142 is mounted on a front end portion of the support plate 110 in order to lock or unlock the third holding link 230.

In addition, a rotary plate 240 is integrally formed on the outer side surface of the third holding link 230, and a predetermined cam path 250, into which the locking pin 142 of the locking block 140 is inserted so as to be locked or unlocked, is formed in the lower surface of the rotary plate 240.

Figure 9:
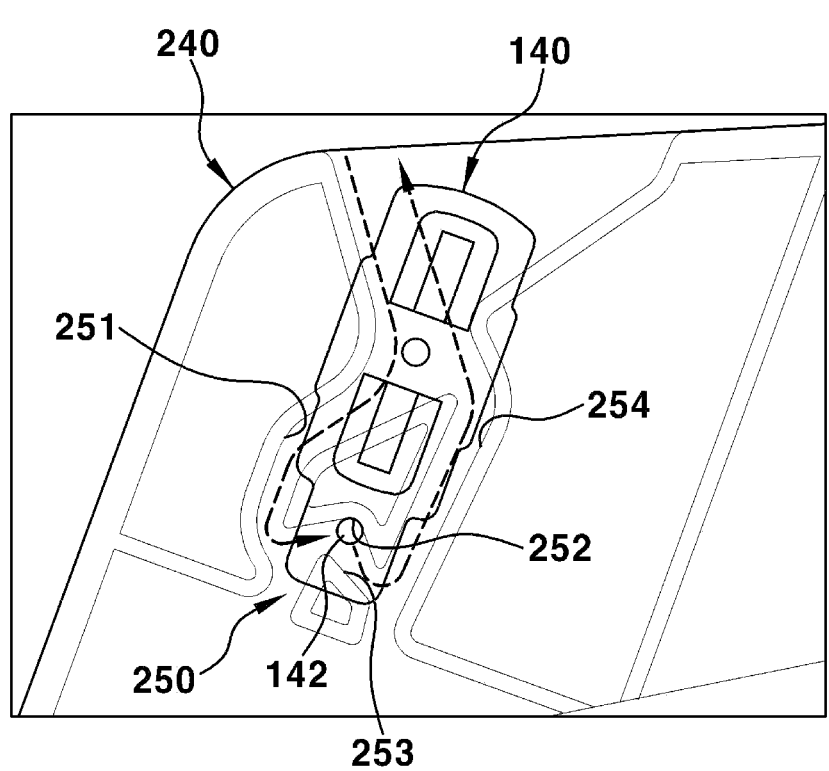
FIG. 9 is an enlarged view for explaining movement of a locking pin of a locking block along a cam path formed in a rotary plate of the first holding link in the cup holder for an armrest of a vehicle according to the present disclosure.

To this end, as shown in FIG. 9, the cam path 250 may include an introduction path 251 into which the locking pin 142 is introduced when the rotary plate 240 is rotated into the storage space, a discharge path 254 from which the locking pin 142 is discharged when the rotary plate 240 is rotated out of the storage space, a locking recess 252 formed in a boundary portion between the introduction path 251 and the discharge path 254 so that the locking pin 142 is inserted thereinto so as to be locked, and a guide path 253 inclined toward the discharge path 254 in order to guide the locking pin 142 inserted into the locking recess 252 to the discharge path 254.

Preferably, a second spring 150 is attached to the support plate 110 in order to elastically support the rotary plate 240 when the rotary plate 240 is pressed.

Hereinafter, the operational process of the cup holder for an armrest of the present disclosure configured as described above will be described.

Figure 10:
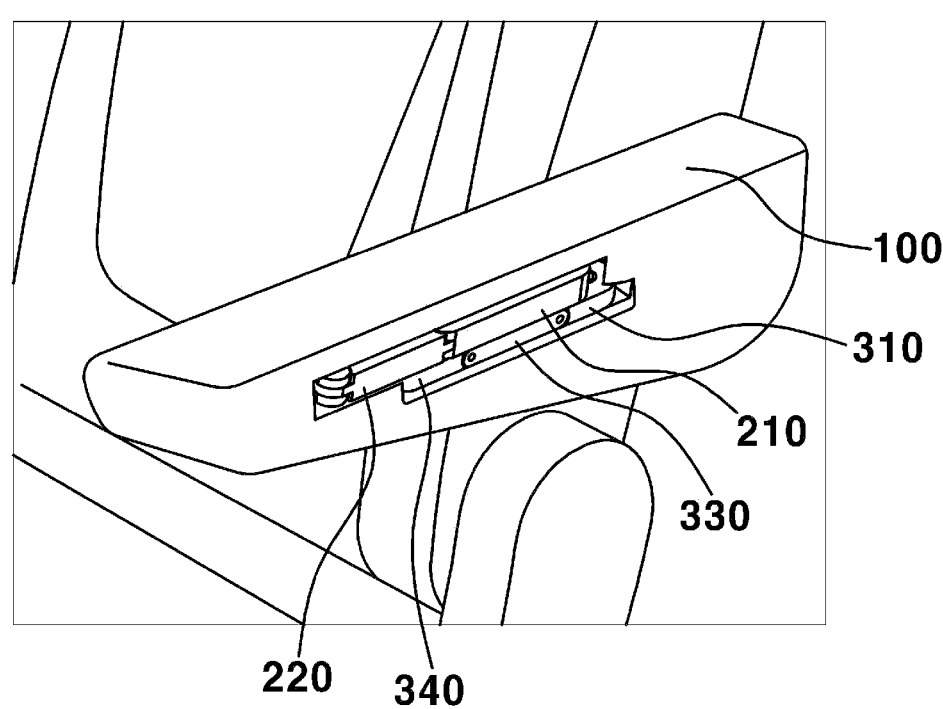
FIG. 10 is an image view showing a state in which the cup holder for an armrest for a vehicle according to the present disclosure is stored in a storage space.
Figure 11:
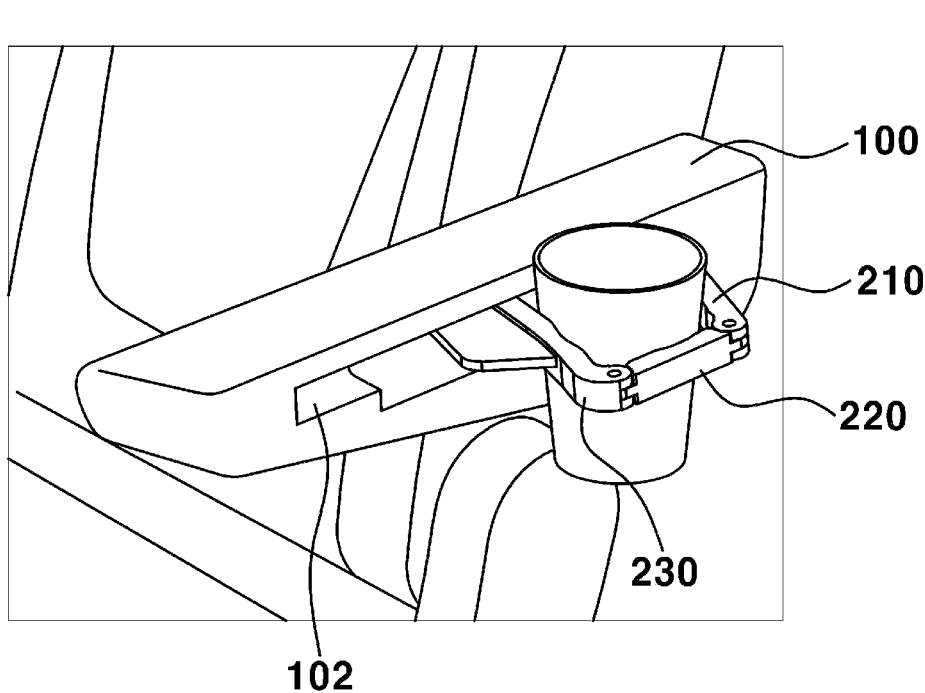
FIGS. 11 and 12 are image views showing a state in which the cup holder for an armrest of a vehicle according to the present disclosure is deployed to a use position.
Figure 12:
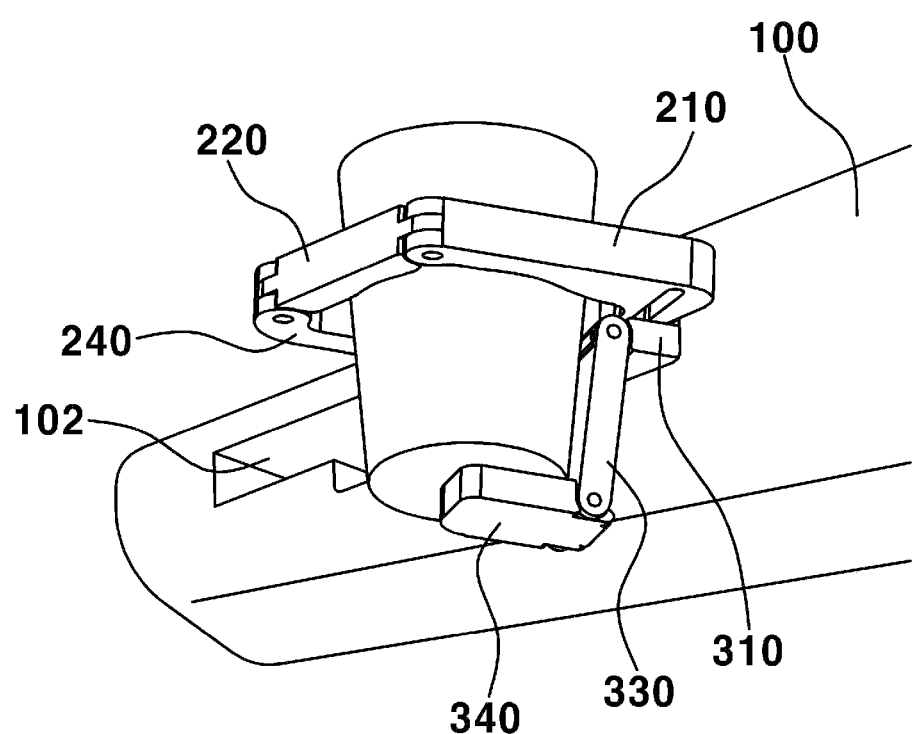

FIG. 10 is an image view showing a state in which the cup holder for an armrest for a vehicle according to the present disclosure is stored in the storage space, and FIGS. 11 and 12 are image views showing a state in which the cup holder for an armrest of a vehicle according to the present disclosure is deployed to a use position.

When the cup holding unit 200 and the cup support unit 300 are stored in the storage space 102 in the armrest 100, as shown in FIG. 10, the cup holding unit 200 and the cup support unit 300 may be stored in the storage space 102 in a manner of being stacked vertically.

In more detail, when the first holding link 210, the second holding link 220, and the third holding link 230 of the cup holding unit 200 are stored in the storage space 102 in the armrest 100, as shown in FIG. 7A, the first holding link 210 and the second holding link 220 may be arranged in a straight line in the forward-backward direction, and the third holding link 230 may be folded while forming as small an angle as possible with the second holding link 220.

In addition, when the first support link 310, the second support link 320, the third support link 330, and the fourth support link 340 of the cup support unit 300 are stored in the storage space 102 in the armrest 100, as shown in FIG. 7B, the first support link 310, the second support link 320, the third support link 330, and the fourth support link 340 may be arranged in a straight line in the forward-backward direction.

At this time, the locking pin 142 of the locking block 140 is inserted into and locked by the locking recess 252 of the cam path 250, whereby the cup holding unit 200 and the cup support unit 300 may be maintained in a state of being stored in the storage space 102 in the armrest 100.

In this way, when not in use, the cup holder including the cup holding unit 200 and the cup support unit 300 are stored in the storage space 102 in the armrest 100. Accordingly, it is possible to solve the problem with the related art in which a cup holder mounted to a distal end of an armrest obstructs the rear view of a driver and the front view of a passenger. In particular, it is possible to easily secure and maintain a space between a left independent seat and a right independent seat, i.e., a passage for a passenger of a rear seat (e.g., third-row seat).

On the other hand, when the user wants to use the cup holder, the user pushes the outer surface of the second holding link 220 to press the third holding link 230.

Subsequently, the third holding link 230 is moved inward by the pressing force while compressing the second spring 150, and the locking pin 142 of the locking block 140 enters the discharge path 254 along the inclined guide path 253 of the cam path 250.

Subsequently, due to the elastic restoring force of the first spring 120 described above, the first holding link 210 is rotated outward about the hinge point at one end portion thereof, and at the same time, the third holding link 230 is rotated outward about the hinge point at one end portion thereof. Accordingly, as shown in FIG. 7A, the first holding link 210, the second holding link 220, and the third holding link 230 may be unfolded and arranged in a U-shape so as to support the peripheral portion of the cup.

At the same time, when the first holding link 210 is rotated to be unfolded to the outside of the storage space 102, as shown in FIG. 8, the guide pin 316 inserted into the guide groove 214 is pushed in the direction in which the first holding link 210 is rotated to be unfolded, whereby the first support link 310 on which the guide pin 316 is formed may be easily rotated together with the first holding link 210 in the unfolding direction in the same rotation trajectory as the first holding link 210.

Subsequently, when the first support link 310 is rotated in the unfolding direction together with the first holding link 210, as shown in FIG. 7B, the second support link 320 and the third support link 330 may be rotated downward with respect to the first support link 310 so as to extend vertically, and the fourth support link 340 may be maintained in a state of extending horizontally so as to support the lower surface of the cup.

As described above with reference to FIG. 7B, since the first hinge hole 312 and the first hinge groove 314 in the first support link 310 and the second hinge groove 344 and the second hinge hole 342 in the fourth support link 340 are arranged in a parallelogram trajectory when connected using virtual straight lines, it is possible to ensure that, when the second support link 320 and the third support link 330 are unfolded so as to extend vertically, the fourth support link 340 is in a state of extending horizontally so as to support the lower surface of the cup.

In more detail, when the first support link 310 is rotated in the unfolding direction, as shown in FIG. 7B, the second support link 320 and the third support link 330 are rotated downward with respect to the first support link 310 so as to extend vertically, and the second support link 330 holds the fourth support link 340 so that the fourth support link 340 is not rotated downward any more from a horizontally extending state, whereby the fourth support link 340 may be maintained in a state of extending horizontally so as to support the lower surface of the cup.

Accordingly, referring to FIGS. 11 and 12, the first holding link 210, the second holding link 220, and the third holding link 230 are unfolded to a use position outside the storage space 102 and arranged in a U-shape so as to support the peripheral portion of the cup, and when the first to fourth support links 310, 320, 330, and 340 are unfolded to a use position outside the storage space 102, the fourth support link 340 is in a state of extending horizontally so as to support the lower surface of the cup. As a result, the user may use the cup holder conveniently.

As is apparent from the above description, the present disclosure exhibits the following effects through the above embodiments.

First, since the cup holder is mounted in an armrest of an independent seat so as to be deployed therefrom and stored therein, it is possible to improve convenience of use of the cup holder by deploying the cup holder to a position beside the armrest when using the same and storing the cup holder in the armrest when not using the same.

Second, since the cup holder is stored in a storage space in an armrest when not in use, it is possible to solve the problem with the related art in which a cup holder mounted to a distal end of an armrest obstructs the rear view of a driver and the front view of a passenger.

Third, since the cup holder is stored in a storage space in an armrest when not in use, it is possible to easily secure and maintain a space between a left independent seat and a right independent seat, i.e., a passage for a passenger of a rear seat (e.g., third-row seat). As a result, the passenger of the rear seat May conveniently get in or out of a vehicle without being disturbed by the cup holder.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An armrest comprising:
an open storage space defined on one side portion of the armrest; and
a cup holder comprising:
a support plate mounted at a bottom of the storage space;
a cup holding unit mounted in the storage space and on the support plate so as to be deployed and stored, the cup holding unit comprising a plurality of holding links connected to each other so as to peripherally support a cup; and
a cup support unit mounted in the storage space and on the support plate so as to be deployed and stored, the cup support unit comprising a plurality of support links connected to each other so as to vertically support the cup,
wherein the cup support unit comprises:
a first support link hinged at one end portion thereof to a rear end portion of the support plate, the first support link comprising a first hinge hole extending through each side surface of another end portion of the first support link and a first hinge groove formed thereon at a position adjacent the first hinge hole, the first support link connected to a first holding link of the cup holding unit so as to rotate in engagement therewith;
a second support link hinged at one end portion thereof to the first hinge groove in the first support link;
a third support link hinged at one end portion thereof to the first hinge hole in the first support link; and
a fourth support link configured to vertically support the cup, the fourth support link comprising a second hinge groove formed on one end portion of the fourth support link so as to allow another end portion of the second support link to be hinged thereto and a second hinge hole extending through each side surface of the fourth support link at a position adjacent the second hinge groove so as to allow another end portion of the third support link to be hinged to the second hinge hole.

2. The armrest of claim 1, wherein an inner portion of an upper surface of the support plate forms a first storage surface on which the cup holding unit is mounted, and an outer portion of the upper surface of the support plate forms a second storage surface on which the cup support unit is mounted, and
wherein the upper surface of the support plate is formed such that the second storage surface is lower than the first storage surface.

3. The armrest of claim 1, wherein the cup holding unit comprises:
a first holding link hinged at one end portion thereof to a rear end portion of the support plate and connected to a first support link of the cup support unit so as to rotate in engagement therewith;
a second holding link hinged at one end portion thereof to another end portion of the first holding link; and
a third holding link hinged at one end portion thereof to a middle portion of the support plate and hinged at another end portion thereof to another end portion of the second holding link.

4. The armrest of claim 3, comprising a first spring connected between the one end portion of the first holding link and the support plate in order to provide elastic restoring force to the first holding link in an unfolding direction.

5. The armrest of claim 1, wherein the first hinge hole, the first hinge groove, the second hinge groove, and the second hinge hole are arranged in a parallelogram shape.

6. The armrest of claim 3, wherein the first support link comprises a guide pin formed on an upper surface thereof, and
wherein the first holding link comprises a straight guide groove formed thereon so as to allow the guide pin to be slidably inserted thereinto.

7. The armrest of claim 3, comprising:
a speed control damper including a damper gear and mounted on the support plate; and

11 a sector gear formed on an outer diameter surface of the
one end portion of the first holding link and configured
to mesh with the damper gear.

8. A cup holder comprising:

a support plate;

a cup holding unit mounted on the support plate so as to
be deployed and stored, the cup holding unit compris-
ing a plurality of holding links connected to each other
so as to peripherally support a cup; and a cup support unit mounted on the support plate so as to
be deployed and stored, the cup support unit compris-
ing a plurality of support links connected to each other
so as to vertically support the cup, wherein at least three holding links are foldably or unfold-
ably connected to each other, wherein at least three support links are foldably or unfold-
ably connected to each other, and wherein the cup support unit comprises:

a first support link hinged at one end portion thereof to
a rear end portion of the support plate, the first
support link comprising a first hinge hole extending
through each side surface of another end portion of
the first support link and a first hinge groove formed
thereon at a position adjacent the first hinge hole, the
first support link connected to a first holding link of
the cup holding unit so as to rotate in engagement
therewith;

a second support link hinged at one end portion thereof
to the first hinge groove in the first support link;

a third support link hinged at one end portion thereof to
the first hinge hole in the first support link; and a fourth support link configured to vertically support
the cup, the fourth support link comprising a second
hinge groove formed on one end portion of the fourth
support link so as to allow another end portion of the
second support link to be hinged thereto and a
second hinge hole extending through each side sur-
face of the fourth support link at a position adjacent
the second hinge groove so as to allow another end
portion of the third support link to be hinged to the
second hinge hole.

9. The cup holder of claim 8, wherein an inner portion of
an upper surface of the support plate forms a first storage
surface on which the cup holding unit is mounted, and an
outer portion of the upper surface of the support plate forms
a second storage surface on which the cup support unit is
mounted, and wherein the upper surface of the support plate is formed
such that the second storage surface is lower than the
first storage surface.

10. The cup holder of claim 8, wherein the cup holding
unit comprises:

a first holding link hinged at one end portion thereof to a
rear end portion of the support plate and connected to
a first support link of the cup support unit so as to rotate
in engagement therewith;

a second holding link hinged at one end portion thereof to
another end portion of the first holding link; and

12 a third holding link hinged at one end portion thereof to
a middle portion of the support plate and hinged at
another end portion thereof to another end portion of
the second holding link.

11. An armrest comprising:

an open storage space defined on one side portion of the
armrest; and a cup holder comprising:

a support plate mounted at a bottom of the storage
space;

a cup holding unit mounted in the storage space and on
the support plate so as to be deployed and stored, the
cup holding unit comprising a plurality of holding
links connected to each other so as to peripherally
support a cup; and a cup support unit mounted in the storage space and on
the support plate so as to be deployed and stored, the
cup support unit comprising a plurality of support
links connected to each other so as to vertically
support the cup, wherein the cup holding unit comprises:

a first holding link hinged at one end portion thereof to
a rear end portion of the support plate and connected
to a first support link of the cup support unit so as to
rotate in engagement therewith;

a second holding link hinged at one end portion thereof
to another end portion of the first holding link; and a third holding link hinged at one end portion thereof to
a middle portion of the support plate and hinged at
another end portion thereof to another end portion of
the second holding link;

wherein the cup holder further comprises a locking block
having a locking pin and mounted on a front end
portion of the support plate in order to lock or unlock
the third holding link.

12. The armrest of claim 11, comprising a rotary plate
integrally formed on an outer side surface of the third
holding link, wherein the rotary plate comprises a cam path formed on
a lower surface thereof so as to allow the locking pin to
be inserted thereinto so as to be locked or unlocked.

13. The armrest of claim 12, wherein the cam path
comprises:

an introduction path into which the locking pin is intro-
duced;

a discharge path from which the locking pin is discharged;

a locking recess formed at a boundary portion between the
introduction path and the discharge path so as to allow
the locking pin to be inserted thereinto so as to be
locked; and a guide path inclined to guide the locking pin inserted into
the locking recess to the discharge path.

14. The armrest of claim 12, comprising a second spring
attached to the support plate and configured to be com-
pressed by a side surface of the rotary plate.

* * * * *